United States Patent

[11] 3,556,268

| [72] | Inventors | Louis P. Fister |
| | | St. Louis; |
| | | William A. Scheublein, Jr., Ballwin, Mo. |
| [21] | Appl. No. | 790,104 |
| [22] | Filed | Jan. 9, 1969 |
| [45] | Patented | Jan. 19, 1971 |
| [73] | Assignee | Moog Industries, Inc. |
| | | St. Louis, Mo. |
| | | a corporation of Missouri |

[54] GAS CONTROLLED ORIFICE IN HYDRAULIC SHOCK ABSORBER
12 Claims, 7 Drawing Figs.

[52] U.S. Cl. ................................................ 188/268,
188/287, 188/315, 280/6
[51] Int. Cl. ................................................ F16f 9/19
[50] Field of Search ................................................ 188/88.1,
88.53, 97, 97.1, 100R; 267/CH, CHS; 280/6H,
124F(Inquired)

[56] References Cited
UNITED STATES PATENTS
1,658,962  2/1928  Aikens .......................... 188/88(.53)

| 2,756,989 | 7/1956 | Peras .......................... | 188/97X |
| 3,054,136 | 9/1962 | Schlage et al. .................. | 188/100X |

FOREIGN PATENTS

| 544,951 | 2/1956 | Belgium ...................... | 188/100(R) |
| 1,057,048 | 10/1953 | France ....................... | 188/88(.83) |
| 1,113,867 | 12/1955 | France ....................... | 188/100(R) |
| 849,342 | 9/1960 | Great Britain ................ | 267/CHS |
| 908,277 | 10/1962 | Great Britain ................ | 188/100(R) |

*Primary Examiner*—George E. A. Halvosa
*Attorney*—Gravely, Lieder and Woodruff

ABSTRACT: A shock absorber assembly embodying a valveless piston movable in a cylinder having hydraulic fluid therein working against the interior of a flow resisting first control means in the form of a flexible sheath or diaphragm having an exterior second control means in the form of a captured gas cushion for controlling the reaction of the piston upon the hydraulic fluid flow through orifices around the piston, the control means combining to impose resistance to fluid transfer around the valveless piston as the piston moves out of its normal static position in response to loads imposed thereon, whereby there is achieved a predetermined bidirectional resistance to piston displacement for absorbing shock loads.

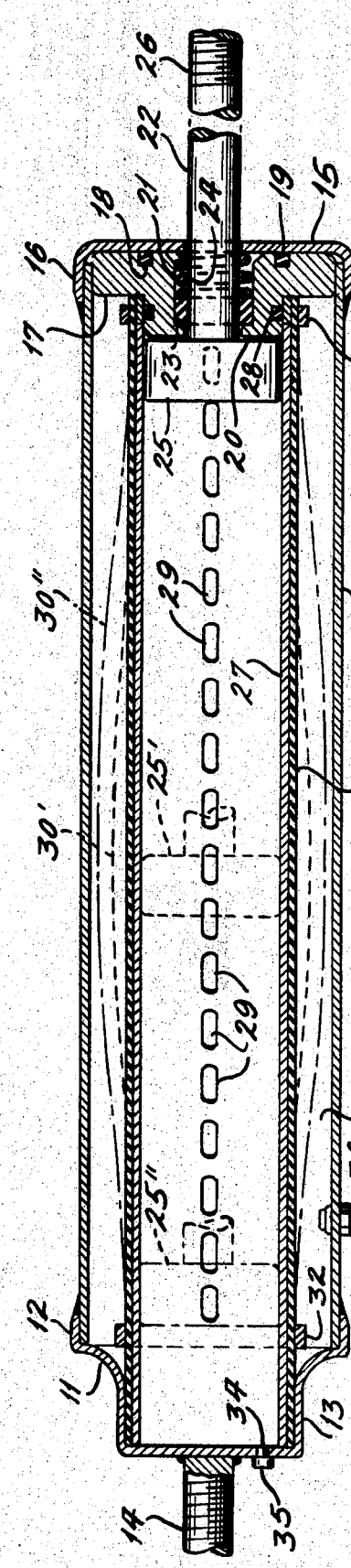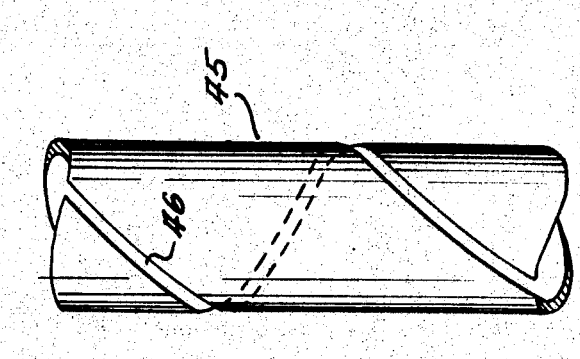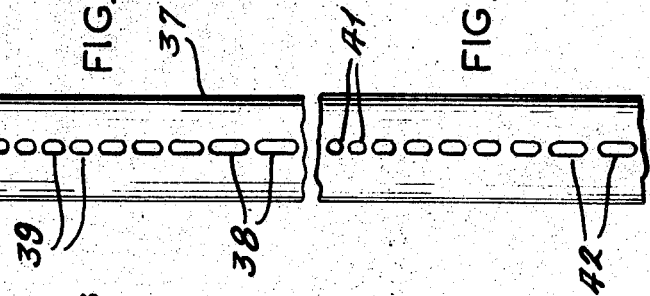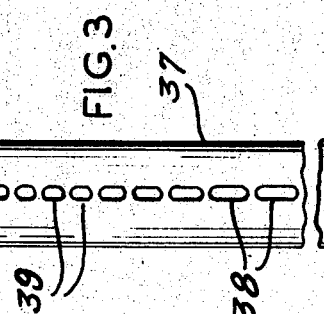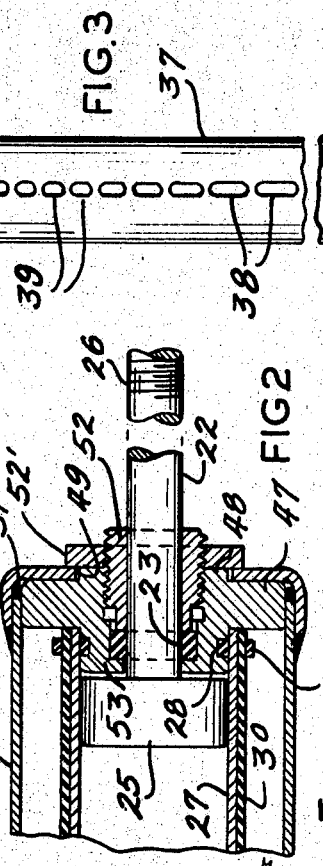

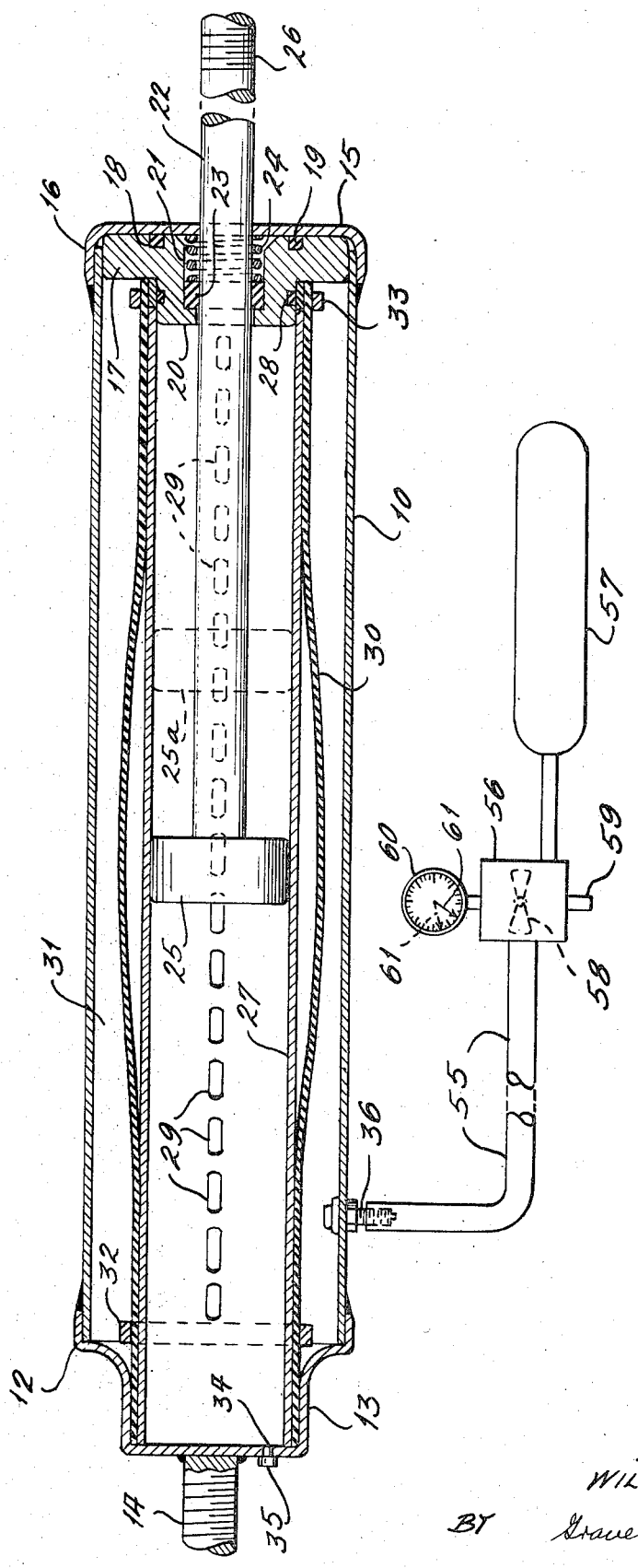

GAS CONTROLLED ORIFICE IN HYDRAULIC SHOCK ABSORBER

This invention relates to improvements in shock absorbers, and is particularly concerned with a shock absorber having control means exerting resistance to forces suddenly tending to displace the movable components from a given position and at a given velocity, which resistance when once predetermined will be substantially uniform at said position for a given velocity over a wide range of temperature conditions.

According to this invention, there is provided at a telescopic fluid shock absorber comprising a working cylinder defining an hydraulic fluid filled space, a valveless piston slidably mounted in the working cylinder, a system of orifices formed in the working cylinder for allowing the hydraulic fluid to flow around the piston in response to piston movement, an enclosing housing for the working cylinder defining an outer chamber, and a first control means in the form of a flexible sheath enclosing the working cylinder and separating the outer chamber into an hydraulic transfer space adjacent the working cylinder and a pressurized gas cushion which constitutes second control means between the first control means and the enclosing housing. The housing is provided with means to mount the same on one of two relatively movable members, and a piston rod extends from the piston outwardly of the housing through a seal and is connected to the other movable member, thereby rendering the shock absorber assembly capable of damping relative movement of the two members.

In operation the resistance to piston movement varies in accordance with the pressure of the gas cushion and increase or decrease in the open area of the orifice system ahead of the piston. The pressurized flexible sheath in the assembly regulates the transfer of the hydraulic fluid through the action of the gas cushion so that the energy absorption has a predetermined relation between the pressure of the gas cushion on the outside of the flexible sheath, the available orifice area and the pressure of the hydraulic fluid being transferred in response to piston displacement. As a result the hydraulic fluid displacement is rendered substantially uniform whether the fluid is cold or hot because when the hydraulic fluid transferred is more viscous when cold the gas cushion, being also cold will by reduced pressure offer less resistance. Upon heating up the hydraulic fluid will flow more freely because it is less viscous, while the gas cushion will expand with heat and develop greater pressure and hence, resistance to flexing of the flexible sheath. Thus, for a given condition of load, velocity of piston and gas pressure, the shock absorber will have a substantially uniform resistance over a wide range of temperature.

In a shock absorber of the foregoing character the pressure of the gas cushion may be varied to increase or decrease its resistance to the transfer of the hydraulic fluid through the orifice system around the piston. Thereby such a shock absorber may be regulated for heavy or light load absorption characteristics merely by varying the pressure of the gas cushion. The shock absorber additionally may be varied in its response to load by selecting different orifice patterns in the working cylinder which will vary the flow of the hydraulic fluid around the piston. By varying the gas cushion pressure the piston can be displaced to change the static length of the housing and piston rod for raising or lowering or levelling a vehicle so as to adjust the load attitude thereof.

A distinct difference over the devices theretofore employed is that in the case of the instant shock absorber the hydraulic fluid does not flow through passages in the piston or actuate movable valve elements, but the fluid must be displaced by the piston through a system of orifices which are open at all times but which present a variable orifice area depending on the location of the piston at any given time when a load is applied to or is sensed by the shock absorber. A conventional shock absorber generally has the same resistance for a given piston velocity at any position of the piston at a given temperature. However, as temperature changes occur the resistance will also change and this causes variations in the magnitude of the resistance for a given piston velocity.

Certain preferred embodiments of this invention will now be described in the following specification and with particular reference to the accompanying drawings, wherein:

FIG. 1 is a longitudinal sectional view of one embodiment of the shock absorber of this invention with the piston in its extreme rebound position which is preferred when initially charging the working cylinder and housing with the respective hydraulic fluid and gas cushioning medium;

FIG. 2 is a fragmentary sectional view of a modified end closure assembly and seal for the piston rod of a shock absorber of the character seen in FIG. 1;

FIG. 3 is a fragmentary elevational view of the working cylinder of the shock absorber of FIG. 1, but illustrating a modified orifice pattern;

FIG. 4 is a view similar to FIG. 3, but showing another orifice pattern;

FIGS. 5 and 6 are fragmentary elevational views of other patterns of orifice openings for the shock absorber of FIG. 1; and FIG. 7 is a longitudinal sectional view of the shock absorber of this invention connected to a controllable source of gas under pressure for changing the characteristics of the shock absorber.

Referring to FIG. 1 the shock absorber assembly of this invention comprises a rigid housing 10 of appropriate length and diameter, a stepped end cap 11 having a flange 12 secured over the end of the housing 10 by welding and a socket portion 13, a threaded shank 14 by which the housing may be connected to one of two relatively movable members, and an opposite end cap 15 having a flange 16 secured over a the housing 10 by welding. The cap 15 encloses a seal mounting plug 17 suitably formed with a seat 18 for a seal element 19 engaged by the end wall of cap 15. The plug 17 has an axial extension 20 to provide an axial bore 21 to slidably receive a piston rod 22 which is engaged by a seal element 23 maintained under compression by a spring 24 under the cap 15. A piston 25 of imperforate valveless character is mounted at the inner end of the rod 22, while the outer end of the rod 22 is provided with a threaded end 26 by which it is connected to the other relatively movable member. The relatively movable members are not shown, but may be parts of a vehicle such as the frame to which shank 14 is connected and an axle to which end 26 is connected. End mounting means other than that shown may be employed, such as eye mounts.

The housing 10 encloses a rigid inner cylinder 27 having one end received over the plug extension 20 and sealed by an element 28. The opposite end of the inner cylinder 27 is received in the socket portion 13 of end cap 11. The cylinder 27 is provided with a series of uniform size orifices 29. The inner cylinder is enclosed in a close fitted flexible and imperforate sheath 30 which separates the cylinder from a chamber 31 defined by the housing 10. One end of the sheath is received in the socket 13 of the end cap 11 and a securing band 32 of nonferrous material is applied to the sheath inwardly of the socket 11 at a position adjacent the endmost one of the orifices 29. The opposite end of the sheath is firmly secured about the inner cylinder at the extension 20 on plug 17, and a nonferrous securing band 33 is applied around the sheath. The securing bands 32 and 33 are preferably mounted by the magnaforming process.

In the assembly thus disclosed, the sheath 30 may be made of flexible and hydraulic fluid resistant material such as rubber, urethane or neoprene. The cylinder 27 and the housing 10 are formed as tubes of sufficient wall thickness or gauge to render them substantially rigid. The system of orifices 29 extends axially over the full stroke of the piston 25 from its full line position (FIG. 1) through its broken line position 25' at mid location to its fully loaded position, shown in phantom outline at 25''.

When charging the shock absorber, it is desirable to have the piston 25 at its extreme rebound position adjacent the plug extension 20. Hydraulic fluid is introduced at the filling opening 34 in cap 11. A plug 35 is then sealed over the opening.

The hydraulic fluid charge is free of air, and the flexible sheath is impervious. A charge of gas (such as air) is introduced to chamber 31 through a suitable valved stem 36 mounted in the housing 10. The stem 36 may be used to bleed off the gas charge if it is desired to reduce the pressure of the gas cushion from some higher pressure level.

When the shock absorber assembly is connected between the axle and frame of a vehicle, or between two relatively movable members, it will reduce its length by the piston 25 moving to its normal mid position 25' (see the broken outline) and as the piston rod 22 reduces the volume of the space in cylinder 27, the flexible sheath 30 will bulge out, as at the broken line position 30', to accommodate the excess fluid. The gas cushion charge will be compressed to some extent to compensate for the volume used by the hydraulic fluid. For full stroke displacement of piston 25 it will go to the phantom position 25'' and the sheath 30 will bulge out to the phantom position 30'' to compensate for the fluid displaced by the piston rod 22. The displacement of piston 25 forces the hydraulic fluid to flow out through the orifices 29 ahead of its direction of movement and the gas cushion outside the sheath 30 because of its being under pressure, forces part of the fluid to flow inwardly through the orifices 29 behind its direction of movement. The flow is resisted by the gas cushion around the sheath 30 so the movement of the piston is not without resistance. The amount of resistance can be regulated by the pressure of the gas cushion, and it is also regulated by the total area of orifices 29 on the leading side of the piston 25. Thus, the orifice area will decrease as the piston moves from position at 25' to the position 25'', and more energy will be absorbed in so doing.

There are a number of variations in the arrangement of the orifice system for the cylinder 27, in order to provide a range of shock energy absorption to meet needed requirements. For example, in FIG. 3 the cylinder 37 which replaces cylinder 27 is provided with a system of orifices which are graduated in size from large orifices 38 at the midposition to small orifices 39 near the end. The portion of cylinder 27 not shown is intended to be a mirror image of the part shown. An orifice system of this character develops an increased resistance to piston movement out of its midposition 25' of FIG. 1. If, on the other hand, a decrease in resistance to piston movement is desired, the cylinder 40 of FIG. 4 may be used. In this alternate cylinder the orifices 41 near the midposition are small in relation to the end orifices 42, and the portion of cylinder 40 not shown is intended to be a mirror image of the part shown. In either case, temperature changes will not substantially alter the response because the resistance of the gas charge is inversely proportional to the viscosity or flowability of the hydraulic fluid.

Other resistance characteristics may be achieved in a shock absorber of the present type by employing a cylinder 43 having a random pattern of equal size orifices 44 extending over its full operative length, or a cylinder 45 may be used in which the orifice pattern is composed of a single continuous slot 46 directed spirally around the cylinder.

In FIG. 2 there is shown an adjustable seal for the piston rod 22. The seal assembly includes a modified plug 47 having an axial boss 48 extending through an opening 49 in the end cap 50. Instead of a seal 18 being under the cap 16 as in FIG. 1, a seal element 51 is positioned adjacent the end of the housing 10. The modified assembly of FIG. 2 includes an adjustable seal for the piston rod 22 in which the threaded sleeve 52 applies the desired pressure upon the rod seal 23 in the plug extension 53. The sleeve 52 is secured by lock nut 52' but may be removed for replacement of the seal 23 when necessary to prolong the life of the shock absorber.

In FIG. 7 the housing 10 has its gas stem 36 connected to a conduit 55 which extends from a suitable control valve member 56 connected to a source 57 of gas under pressure. The valve 56 is provided with an actuator means 58 to admit gas from the source 57 to conduit 55 for increasing the pressure in the housing 10 outside the sheath 30. The valve actuator means 58 also can be used to decrease the pressure by opening the bleed element 59 to conduit 55. A gauge 60 may be connected into the foregoing system to indicate the pressure in housing 10. For example, the needle 61 of the gauge 60 may be at a given pressure reading (as shown), and if the piston rod 22 is to be extended to a new position increased pressure is admitted to the housing 10 to squeeze the sheath 30 more toward the cylinder 27, as shown by the needle 61 in its dotted position. The increased pressure will force the hydraulic fluid inside the bulge of the sheath 30 to flow into the cylinder on the end of the piston 25 opposite the rod 22 and force the piston to assume a new position at 25a. The shock absorber of FIG. 7 is similar to that seen in FIG. 1 and like numerals of reference will be applied.

In the present embodiments, the response of the shock absorber is dependent upon the relationship of the viscosity of the hydraulic fluid and pressure of the gas charge with temperature, the character of the applied load or force as to whether it is slowly or suddenly applied, the amount of pressure of the gas charge, and the selected orifice system in the working cylinder. The shock absorber response can be preselected on the basis of its orifice system and gas pressure and will be substantially uniform over a wide range of temperature conditions because the resistance of the gas charge is inversely proportional to the flowability or viscosity of the hydraulic fluid.

The present structure as noted before embodies a valveless or imperforate piston 25 which on movement displaces fluid from in front of its direction of movement and makes a space behind it for the fluid so displaced. The prior art generally relies on valves in the piston, whereas in this improved assembly the valve means consists in the first control means 30 which directly covers and uncovers the orifices 29 (FIG. 1). The first control means is the flexible sheath which acts to cover the orifices 29, and the action of the first control means is subject to a second control means which is the charge of gas under pressure in the annular space 31 within the cylinder 10. Therefore, the orifices or ports in the cylinder 27 are controlled by the first control 30 under the influence of the second means which is the gas charge that regulates the resistance to fluid flow of the first control 30.

The foregoing description relates to certain preferred embodiments of the invention for showing a range of possible variations with some of the components. It is, therefore, understood that these and other variations are intended to be included in the scope of this disclosure.

We claim:

1. In a shock absorber assembly for resisting motion between two relatively movable bodies, first and second cylinders in substantially concentric relation, means closing the opposite ends of said cylinders to provide a pair of working spaces separated by the wall of the innermost one of said cylinders, a system of orifices formed in said separating wall, a first orifice control means in one of said working spaces adjacent said orifice system, a valveless piston in the other of said working spaces, a force transmitting rod connected to said valveless piston and extending outwardly of one of said end closing means, a fluid charge in said other working space on both sides of said valveless piston and flowable through said orifice system upon displacement of said valveless piston, and a second orifice control means under pressure in said one working space normally pressing said first orifice control means in a direction to resist the flow of the fluid charge from one side to the other of said valveless piston through said orifice system; said first and second orifice control means being operative to resist displacement of said valveless piston in said fluid charge.

2. In an hydraulic shock absorber assembly, a housing, closure means on the opposite ends of said housing, a working cylinder positioned in said housing between said closure means, a said working cylinder having an orifice system therein, a first control means for said orifice system adjacent and surrounding said working cylinder and isolating said working cylinder from the interior space of said housing, a valveless piston slidably mounted in said working cylinder, a piston rod connected to said piston and extending outwardly of said housing through an end closure means, a charge of hydraulic fluid filling said working cylinder on each side of said piston, a second control means for said orifice system pressing said first control means into engagement with said cylinder, said orifice system in said working cylinder extending in axially spaced array over the length of said cylinder within said first control means, said first control means progressively yielding outwardly from said cylinder during transfer of the hydraulic fluid around said valveless piston through said orifice system upon piston motion, and the yielding of said first control means being resisted by the pressure of said second control means in inverse proportion to the flowability of said hydraulic fluid charge.

3. The shock absorber set forth in claim 2 wherein said orifice system includes means presenting a variable open area on each side of said piston, which area decreases ahead of the direction of piston displacement and increases its area behind the direction of piston displacement.

4. In an hydraulic shock absorber assembly, having a gas controlled valve system, a cylinder having an orifice system formed in its side wall and extending lengthwise thereof, a first control means surrounding said cylinder and adjacent the exterior thereof over said orifice system, a rigid housing enclosing said cylinder and first control means and sealing the opposite ends of said cylinder, a piston rod slidably mounted in said housing and extending into said cylinder, a valveless piston carried on said rod within said cylinder and movable therewithin in response to load forces imposed on said housing and rod, a charge of hydraulic fluid filling the space within said cylinder, and a second control means within said housing outside of said first control means, said second control means exerting a resistance to the transfer of hydraulic fluid from one side to the other of said valveless piston through said orifice system upon piston movement in response to changes in the load forces.

5. In the shock absorber assembly of claim 4 said orifice system comprising a series of spaced orifices of substantially uniform size through which said hydraulic fluid flows upon piston movement.

6. In the shock absorber assembly of claim 4 said orifice system comprising a series of spaced orifices varying in size from large near the midposition of said piston in said cylinder to small near the opposite ends of said cylinder.

7. In the shock absorber assembly of claim 4 said orifice system comprising a series of spaced orifices varying in size from small near the midposition of said piston in said cylinder to large near the opposite ends of said cylinder.

8. In the shock absorber assembly of claim 4 said orifice system comprising a random array of orifices in said cylinder extending throughout the effective maximum travel of said piston in said cylinder.

9. In the shock absorber assembly of claim 4 a source of gas under pressure connected to said housing, and control means in said connection selectively increasing and decreasing the gas charge to vary the static load position of said piston in said cylinder.

10. In the shock absorber assembly of claim 4 said first control means consists of a flexible and imperforated sheath.

11. In the shock absorber assembly of claim 4 said second control means consists of a gas charge under pressure.

12. In the shock absorber assembly of claim 11 valve means mounted in said housing admitting said gas charge, said valve means permitting changes in the pressure of said gas charge.